Nov. 5, 1940.　　P. U. LANNERD ET AL　　2,220,250
CULINARY VESSEL
Filed Feb. 10, 1939

INVENTORS.
PAUL U. LANNERD.
CLYDE C. CARR.
BY Lockwood, Goldsmith & Galt,
ATTORNEYS.

Patented Nov. 5, 1940

2,220,250

UNITED STATES PATENT OFFICE 2,220,250

CULINARY VESSEL

Paul U. Lannerd, North Tonawanda, N. Y., and Clyde C. Carr, Chicago, Ill.

Application February 10, 1939, Serial No. 255,566

1 Claim. (Cl. 53—8)

This invention relates to a cooking utensil suitable for cooking foods under a partial vacuum.

In the cooking of common foods, heat is applied for the purposes of first, pasteurizing the food to destroy harmful bacteria, second, promoting certain endothermic chemical reactions to change the chemical nature of the food to a more easily digestible and more palatable form and third, to change the physical condition by breaking down the cellular structure by the vaporization of the moisture contents of the cells. The first and second of these objects may be attained by cooking considerably below the atmospheric boiling point of water. When cooking is carried out at atmospheric pressure, however, the third object requires temperatures at least as high as 212° F. The common method of boiling food at or above atmospheric pressure results in the loss in the escaping vapor of a large part of the volatile organic and mineral elements of the food and thus reduces the food value to a great extent. When such cooking is carried out under a partial vacuum, however, there is no tendency for the escape of vapor and all of the original contents of the food is preserved. At the same time the breaking down of the cellular structure of the food takes place at a temperature correspondingly below the atmospheric boiling point.

An object of the present invention is to provide a cooking utensil, particularly adapted for household use, in which food may be cooked under a partial vacuum to preserve the complete food value thereof.

Another object of the invention is to provide a utensil of as simple a design as possible in which a sub-atmospheric pressure may be produced by simple manipulation of the amount of heat supplied thereto.

Figure 1:
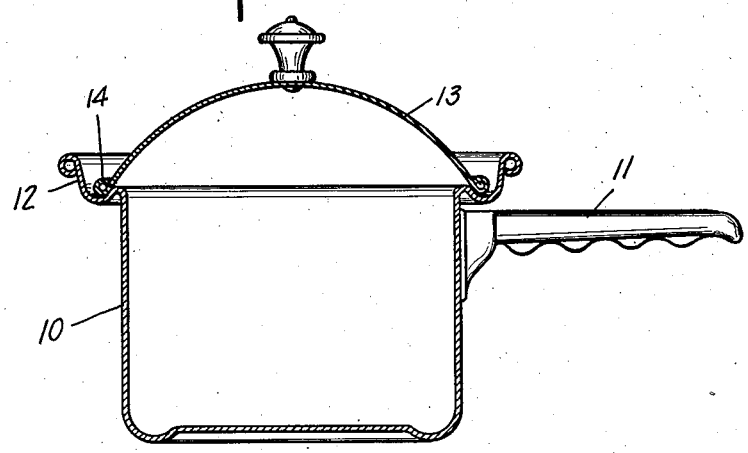
Figure 2:
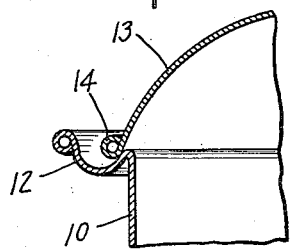

Other objects of the invention and the full nature thereof will be understood from the accompanying drawing and the following description and claim:

Fig. 1 is a central sectional view of a cooking utensil constructed in accordance with the invention. Fig. 2 is a fragmentary sectional view on an enlarged scale of a portion of Fig. 1.

The utensil shown in Fig. 1 consists of a vessel 10 provided with the usual handle 11 and having formed about its upper edge a rim 12 shaped to provide an annular trough. An upwardly arched cover 13 has its edges 14 seated in the trough formed by the rim 12. Both the vessel 10 and the cover 13 are preferably made from relatively light and flexible metal such as that commercially known as "stainless steel."

In the use of the invention particularly for foods to be boiled, the vessel 10 is partially filled with water, the food placed therein and the cover 13 placed in position. Heat is then supplied at a rate sufficient to bring the water to a temperature above 212° F. The resulting steam pressure within the vessel partially raises the cover and permits the air and some of the steam to escape, leaving the vessel substantially filled with steam. During this operation the cover 13 acts as a condensing surface on which a portion of the steam condenses but the heat is supplied at a greater rate than the heat loss from the condensing surface and thus the condensation does not prevent the building up of sufficient pressure to expel the air. Some of the condensate, however, trickles down the under side of the hover 13 and enters the trough 12.

When the air has been completely expelled, the rate of heat supply is reduced to a point where the heat loss from the condensing surface is greater than the heat input. Under these conditions, the rate of condensation is greater than the rate of evaporation and a very slight partial vacuum is thus produced within the vessel. The water in the trough 12 acts as a water seal to prevent reentrance of air for breaking this vacuum. The water seal alone however, is not sufficient to provide a sufficient seal as the pressure within the vessel decreases beyond a very slight degree. It is for that reason that the cover 13 or the trough 12, or both, are made sufficiently flexible so that the downward pressure on the cover due to the slight partial vacuum is sufficient to press the edges of the cover against the surface of the trough 12 with a uniform pressure around the circumference thereof. Thus, the formation of the slight partial vacuum by the provision of the water seal permits the cover to be pressed down tightly enough to provide a seal capable of sustaining an even greater difference of pressure between the exterior and interior of the vessel.

As the partial vacuum increases, the corresponding boiling point of the water decreases. The steam temperature naturally follows the boiling point of the water and thus less heat is radiated from the surface of the cover 13. At length a point of equilibrium is reached at which the rate of heat loss is equal to the rate of heat input and the cooking may be continued at the temperature and pressure corresponding to this equilibrium condition. Thus cooking may be carried out indefinitely at a sub-atmospheric pressure and at a temperature below the atmospheric boiling point of water without the loss of any of the volatile ingredients of the food. Obviously, the most important feature in the construction of the utensil is the provision of sufficient flexibility and a sufficiently accurate fit between the edges of the cover 13 and the trough 12 so that a seal may be effected which prevents the entrance of air with greater pressure differences than can be effected by the water seal alone.

In Fig. 2 there is shown a construction in which the edge 14 of the cover 13 engages a downwardly sloping portion of the face of the trough 12. This construction provides a wiping contact between the surfaces of the cover and the surfaces of the trough which permits of a more effective seal with less flexibility of the cover than when the cover is seated in the bottom of the trough.

Variations in the details of the invention may be made without departing from the scope thereof as defined by the appended claim.

The invention claimed is:

In combination, a cooking vessel having an annular trough formed about the rim thereof, and an upwardly arched cover, said trough having inclined side portions and said cover having its edges normally engaging said side portions and adapted to move downwardly in contact therewith toward the bottom of said trough when said cover is downwardly pressed by the formation of a slight partial vacuum within the vessel.

PAUL U. LANNERD.
CLYDE C. CARR.